United States Patent [19]
Arbit

[11] 4,225,403
[45] Sep. 30, 1980

[54] PROCESS FOR IMPROVING FILMS OF POLY(p-METHYLSTYRENE) AND COPOLYMERS THEREOF BY HIGH ENERGY RADIATION TREATMENTS

[75] Inventor: Harold A. Arbit, Highland Park, N.J.

[73] Assignee: Mobil Oil Corporation, New York, N.Y.

[21] Appl. No.: 13,639

[22] Filed: Feb. 21, 1979

[51] Int. Cl.$^2$ ............................. C08F 2/46; C08F 8/00
[52] U.S. Cl. ........................... 204/159.14; 204/159.17; 204/159.2
[58] Field of Search ............ 204/159.14, 159.2, 159.17

[56] References Cited
PUBLICATIONS

Dole; The Radiation Chemistry of Macromolecules; Academic Press, vol. II, pp. 57-96, 1973.

Chapiro, Radiation Chemistry of Polymeric Systems, Wiley & Sons, pp. 446-452, 1962.

Primary Examiner—Richard B. Turer
Attorney, Agent, or Firm—Charles A. Huggett; Hastings S. Trigg

[57] ABSTRACT

This invention provides a method for improving properties of thermoplastic films that comprises irradiating films of poly(p-methylstyrene) of p-methylstyrene copolymers with acrylonitrile, or of high impact poly (p-methylstyrene) with ionizing radiation at a dosage between about 30 megarads and about 70 megarads (preferably between about 40 megarads and about 60 megarads), whereby said films are heat resistant and have increased tensile properties at elevated temperatures.

5 Claims, 1 Drawing Figure

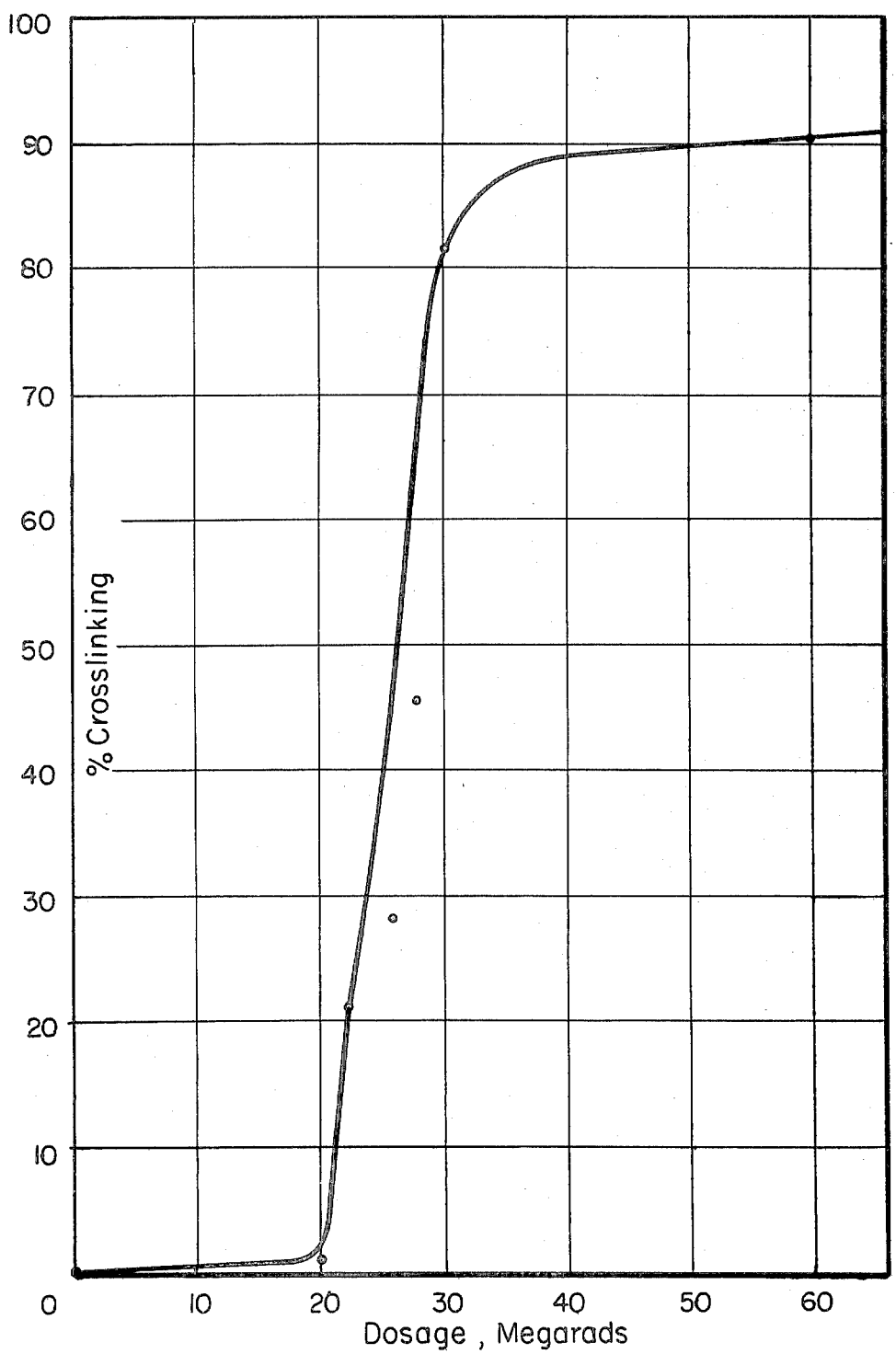

PROCESS FOR IMPROVING FILMS OF POLY(p-METHYLSTYRENE) AND COPOLYMERS THEREOF BY HIGH ENERGY RADIATION TREATMENTS

BACKGROUND OF THE INVENTION

1. Field of the Invention

This invention is directed to improving the properties of films of p-methylstyrene polymers and copolymers by irradiation.

2. Description of the Prior Art

Insofar as is now known, the process described in this application has not been proposed.

SUMMARY OF THE INVENTION

This invention provides a method for improving properties of thermoplastic films that comprises irradiating films of poly(p-methylstyrene), of p-methylstyrene copolymers with acrylonitrile, or of high impact poly (p-methylstyrene) with ionizing radiation at a dosage between about 30 megarads and about 70 megarads (preferably between about 40 megarads and about 60 megarads), whereby said films are heat resistant and have increased tensile properties at elevated temperatures.

DESCRIPTION OF THE DRAWING

The drawing presents a curve showing the graphic relationship between the megarads of radiation dosage and the degree of cross-linking as measured by percent gelation.

DESCRIPTION OF SPECIFIC EMBODIMENTS

The monomer used in preparing the homopolymer or copolymers from which the films are prepared in accordance with this invention is p-methylstyrene. It is within the contemplation of this invention to use mixtures of methylstyrene rich in p-methylstyrene. Such mixtures contain at least about 95 weight percent, preferably 97–99 weight percent, p-methylstyrene and less than 0.1 weight percent o-methylstyrene with the balance being m-methylstyrene. A typical mixture contains, by weight, about 95 percent p-methylstyrene, about 5 percent m-methylstyrene, and about 0.05 percent o-methylstyrene. The mixtures are obtained by catalytic dehydrogeneration of the mixtures of ethylmethyl benzene isomers described in U.S. Pat. No. 4,086,287 to which reference is made.

The polymers contemplated herein are p-methylstryene or p-methylstyrene-rich isomer mixture homopolymer or their copolymers that are analogous to the well known styrene-acrylonitrile copolymers (about 70% styrene and about 30% acrylonitrile) and high impact polystrene, i.e., p-methylstyrene-acrylonitrile copolymers and high impact poly(p-methylstryene). The polymerization reaction is carried out by using methods and catalysts well known in the art for polymerizing styrene. The reaction can be carried out in solution, bulk, suspension, or emulsion.

The films that are contemplated herein can be produced by any of the well known methods for producing films, such as by casting, blowing, and slot extrusion.

In accordance with this invention, the films made from poly (p-methylstyrene) are irradiated, i.e., subjected to ionizing radiation. Ionizing radiation is inclusive of extremely short-wavelength, high energetic, penetrating rays such as gamma rays, X-rays, and subatomic particles accelerated in cyclotrons, betatrons, synchrotrons, and linear accelerators. The effect of irradiating the film is to cross-link the poly (p-methylstyrene). The irradiation dose can be between about 30 megarads and about 70 megarads, preferably between about 40 megarads and about 60 megarads.

EXAMPLE 1

Poly(p-methylstyrene) (PPMS) was dissolved in toluene at room temperature to form a 25 weight percent solution. The solution was cast with a Gardner film applicator onto a polyethylene terephthalate release sheet. The solvent was evaporated in a 115° C. vacuum oven for about one hour to yield 2 mil films at constant weight. Samples of the films were irradiated at different megarad dose levels with an electron beam at 150 kV and 3 mA. Crosslinking was determined by placing a sample in toluene at room temperature overnight. Any insoluble gel was filtered and dried to constant weight 115° C. The degree of crosslinking was measured as the weight percent gel formed. Pertinent data are set forth in Table I, together with data for irradiated polystyrene film.

Samples of the poly (p-methylstyrene), non-irradiated and irradiated at 50 megarads, were tested for tensile properties (ASTM-D638) at 110° C. The results are set forth in Table II.

Table I

| Dosage, Megarads | % Crosslinking | |
| --- | --- | --- |
|  | PPMS | PS |
| 0 | 0 | 0 |
| 20 | 1.0 | 0 |
| 22 | 21.4 | 0 |
| 24 | 38.7 | 0 |
| 26 | 28.3 | 0 |
| 28 | 45.8 | 0 |
| 30 | 81.6 | 0 |
| 40 | 89.6 | 0 |
| 50 | 79.3 | 0 |
| 60 | 90.2 | 0 |

Table II

| | Megarad Dosage | |
| --- | --- | --- |
| Test, units | 0 | 50 |
| Tangent Modulus, psi $\times 10^{-4}$ @ 110° C. | 0.4 | 6.3 |
| Yield Strength, psi $\times 10^{-2}$ @ 110° C. | 0.4 | 5.9 |
| Ultimate Strength, psi $\times 10^{-2}$ @ 110° C. | 0.6 | 2.9 |
| Break Elongation, % @ 110° C. | >128 | 77 |

The drawing presents a curve, based upon the data set forth in Table I, showing the relationship between the percent of crosslinking of PPMS and irradiation dosage in megarads. It will be noted that a high degree of crosslinking is effected at a dosage of between about 30 megarads and about 70 megarads. A preferred range is between about 40 megarads and about 60 megarads. Polystyrene is not crosslinked under these conditions.

From the data set forth in Table II, it will be noted that the high temperature (110° C.) tensile properties of PPMS films, non-irradiated, were improved by irradiation at 50 megarads. Thus a 15-fold increase in modulus and yield was obtained over the non-irradiated control.

EXAMPLE 2 p-Methylstyrene-acrylonitrile copolymer (PMSAN) containing about 70 percent p-methylstyrene was pressed into 5 to 5.5 mil films. Samples were irradiated at 50 megarads. Similarly, 5 to 5.5 mils films were prepared from SAN (about 70 percent styrene) and samples were irradiated at 50 megarads. The amount of crosslinking was determined for the specimens, using the procedure described in Example 1. Pertinent results are set forth in Table III.

Table III

| Polymer | % Crosslinking @ | |
|---------|------------------|---|
|         | 0 Megarad | 50 Megarads |
| PMSAN   | 0 | 88.7 |
| SAN     | 0 | 0 |

From the data set forth in Table III, it will be noted that, like PPMS, the PMSAN can be crosslinked by irradiation. SAN, on the other hand, is not crosslinked at 50 megarads.

EXAMPLE 3

Films were prepared from high impact polystyrene (HIPS) and from high impact poly (p-methylstyrene) (HIPMS), each containing about 5 weight percent butadiene rubber, by pressing 3 to 4 mil films from 25 mil sheet. Some of the films of each type were irradiated at 50 megarads and degree of crosslinking of non-irradiated and irradiated films was determined, as described in Example 1. The pertinent data are set forth in Table IV.

Table IV

| Polymer | % Crosslinking @ | |
|---------|------------------|---|
|         | 0 Megard | 50 Megarads |
| HIPMS   | <1 | 89.3 |
| HIPS    | 0 | 0 |

From the data set forth in Table IV, it will be noted that HIMPS, like PPMS, can be crosslinked by irradiation. HIPS, on the other hand, is not crosslinked at 50 megarads.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A method for improving properties of thermoplastic films that comprises irradiating films of poly (p-methylstyrene), of p-methylstyrene copolymers with acrylonitrile, or of high impact poly (p-methylstyrene) with ionizing radiation at a dosage between about 30 megarads and about 70 megarads, whereby said films are heat resistant and have increased tensile properties at elevated temperatures.

2. The method of claim 1, wherein said dosage is between about 40 megarads and about 60 megarads.

3. The method of claim 2, wherein said film is a film of poly(p-methylstyrene).

4. The method of claim 2, wherein said film is a film of p-methylstyrene-acrylonitrile copolymer containing about 70 percent p-methylstyrene.

5. The method of claim 2, wherein said film is a film of high impact poly(p-methylstyrene).

* * * * *